(12) United States Patent
Yoshitake et al.

(10) Patent No.: US 11,401,986 B2
(45) Date of Patent: Aug. 2, 2022

(54) VEHICLE CONTROL DEVICE, AND IRREGULAR GROUND TRAVELING VEHICLE INCLUDING THE SAME

(71) Applicant: YAMAHA HATSUDOKI KABUSHIKI KAISHA, Iwata (JP)

(72) Inventors: Shota Yoshitake, Shizuoka (JP); Kengo Minami, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/070,985

(22) Filed: Oct. 15, 2020

(65) Prior Publication Data

US 2021/0115987 A1 Apr. 22, 2021

(30) Foreign Application Priority Data

Oct. 17, 2019 (JP) .............................. JP2019-190343

(51) Int. Cl.
*F16D 48/06* (2006.01)
*F16H 63/46* (2006.01)
*B60L 15/20* (2006.01)

(52) U.S. Cl.
CPC .............. *F16D 48/06* (2013.01); *B60L 15/20* (2013.01); *F16H 63/46* (2013.01); *F16D 2500/10412* (2013.01); *F16D 2500/30415* (2013.01); *F16D 2500/30426* (2013.01); *F16D 2500/3108* (2013.01); *F16D 2500/3109* (2013.01); *F16D 2500/70408* (2013.01)

(58) Field of Classification Search
CPC ........... F16D 48/06; F16D 2500/30415; F16D 2500/30426; F16D 2500/3108; F16D 2500/3109; F16D 2500/70408; B60L 15/20
See application file for complete search history.

(56) References Cited

U.S. PATENT DOCUMENTS

| | | | |
|---|---|---|---|
| 4,971,183 A * | 11/1990 | Tellert .............. | B60W 30/1819 192/103 R |
| 2015/0291059 A1* | 10/2015 | Kawasaki ............ | B60W 20/00 180/65.265 |
| 2017/0219029 A1* | 8/2017 | Shiozaki ................ | F16D 48/06 |
| 2017/0284483 A1 | 10/2017 | Ono et al. | |
| 2018/0073454 A1* | 3/2018 | Kono ................. | F02D 41/0225 |

* cited by examiner

*Primary Examiner* — Edwin A Young
(74) *Attorney, Agent, or Firm* — Keating and Bennett, LLP

(57) ABSTRACT

A controller for a vehicle driven by transmitting a torque generated by a torque generator to driving wheels corrects the torque generated by the torque generator according to a torsion rate of an elastic torsion element present in a torque transmission system extending from the torque generator to the driving wheels to reduce the torsional vibration of the elastic torsion element. The torque generator may include an engine and a clutch to transmit a rotation of the engine to the torque transmission system. The controller may include a clutch controller to correct the torque generated by the torque generator by controlling the transmission torque of the clutch according to the torsion rate of the elastic torsion element.

10 Claims, 8 Drawing Sheets

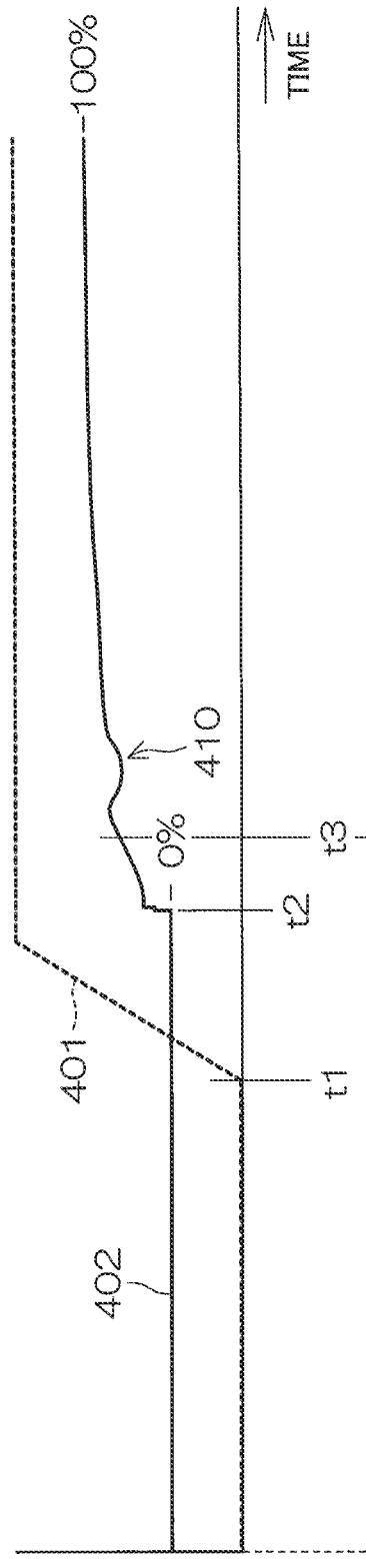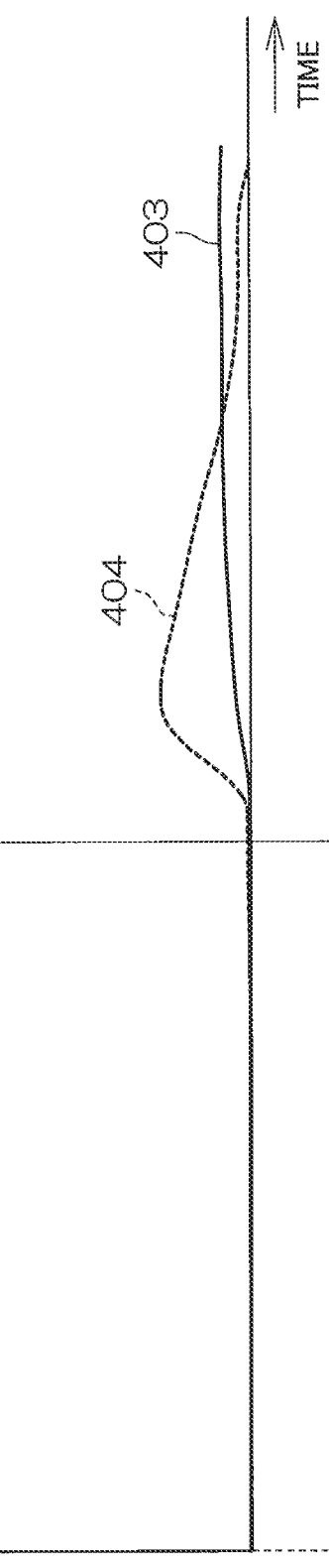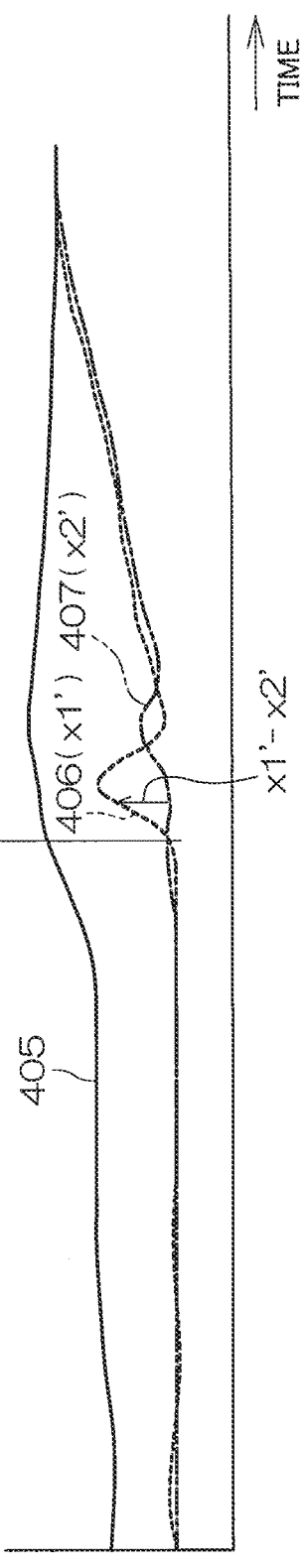

CLUTCH COMMAND VALUE
THROTTLE OPENING DEGREE

JERK DEGREE ACCELERATION

ROTATION SPEED

VEHICLE CONTROL DEVICE, AND IRREGULAR GROUND TRAVELING VEHICLE INCLUDING THE SAME

CROSS REFERENCE TO RELATED APPLICATIONS

This application claims the benefit of priority to Japanese Patent Application No. 2019-190343 filed on Oct. 17, 2019. The entire contents of this application are hereby incorporated herein by reference.

BACKGROUND OF THE INVENTION

1. Field of the Invention

The present invention relates to a vehicle control device, and an irregular ground traveling vehicle including the vehicle control device.

2. Description of the Related Art

US 2017/0284483 A1 discloses a multi-utility vehicle having a power unit, and front wheels and rear wheels. The power unit includes an engine and a stepped transmission of an electrically changeable type to supply a driving force to the front wheels and/or the rear wheels. A shift clutch is provided between the transmission and the engine. The shift clutch is engaged and disengaged by a shift motor, and the shift stage of the transmission is switched by the shift motor. The shift motor is actuated in response to a user's operation of an upshift switch and a downshift switch.

US 2017/0284483 A1 points out a problem such that smooth clutch engagement cannot be ensured when the rotation speed of a counter shaft of the transmission is suddenly fluctuated due to torsion or the like occurring in a drive system provided downstream of the transmission, and discloses a solution to this problem. Specifically, a clutch engagement control device disclosed in US 2017/0284483 A1 is arranged to engage the shift clutch after the sudden fluctuation in the rotation speed of the counter shaft is converged.

SUMMARY OF THE INVENTION

The inventor of preferred embodiments of the present invention described and claimed in the present application conducted an extensive study and research regarding a vehicle control device, such as the one described above, and in doing so, discovered and first recognized new unique challenges and previously unrecognized possibilities for improvements as described in greater detail below.

When a torque transmission path is established between a drive source such as the engine and the driving wheels with the clutch engaged, an elastic torsion element present in the torque transmission path downstream of the clutch is elastically distorted, and torque transmission is started.

Since the elastic torsion element is restored from the distortion, the torsion is vibrationally fluctuated. Thus, the torque transmitted to the driving wheels includes a vibrational component, so that the driving force includes vibrations that may cause pitching of the vehicle.

Therefore, an uncomfortable vehicle behavior occurs in the clutch engagement, more specifically, during the starting of the vehicle and in the shift change.

Particularly, in a vehicle required to have a light weight and a higher torque, such as an irregular ground traveling vehicle, the drive source generates a higher torque, while the torque transmission path downstream of the clutch has a relatively small rigidity to satisfy the requirement for the light weight. In addition, a clutch damper is often provided downstream of the clutch to reduce a shock occurring in the torque transmission. Therefore, it is virtually impossible to eliminate the elastic torsion element downstream of the clutch. Rather, an elastic torsion element having a greater size is even an essential element to reduce the shock to provide a comfortable ride feeling in the vehicle. On the other hand, as described above, the vehicle pitching behavior is liable to occur due to the torsional vibration of the elastic torsion element, thus requiring improvement for a comfortable ride feeling.

In US 2017/0284483 A1, this problem is not pointed out, and cannot be solved by the arrangements disclosed in US 2017/0284483 A1.

In order to overcome the previously unrecognized and unsolved challenges described above, preferred embodiments of the present invention provide vehicle control devices each of which reduces the vibrational vehicle behavior attributable to the elastic torsion element of the torque transmission system, and an irregular ground traveling vehicle including the vehicle control device.

According to a preferred embodiment of the present invention, a control device for a vehicle driven by transmitting a torque generated by a torque generator to driving wheels includes a controller configured or programmed to correct the torque generated by the torque generator according to the torsion rate of an elastic torsion element present in a torque transmission system extending from the torque generator to the driving wheels to reduce the torsional vibration of the elastic torsion element.

With this arrangement, the torque generated by the torque generator is corrected according to the torsion rate of the elastic torsion element. This makes it possible to reduce the torsional vibration of the elastic torsion element, thus reducing the vibrational vehicle behavior.

In a preferred embodiment of the present invention, the torque generator includes an engine and a clutch to transmit the rotation of the engine to the torque transmission system. The vehicle controller is configured or programmed to include a clutch controller that corrects the torque generated by the torque generator by controlling the transmission torque of the clutch according to the torsion rate of the elastic torsion element.

With this arrangement, a torque generated by the engine is corrected by controlling the transmission torque of the clutch. Further, the torsional vibration of the elastic torsion element is reduced by controlling the transmission torque of the clutch according to the torsion rate of the elastic torsion element. Thus, the vibrational vehicle behavior is reduced.

In a preferred embodiment of the present invention, the clutch controller reduces the transmission torque of the clutch according to the torsion rate of the elastic torsion element. This arrangement makes it possible to reduce the torsional vibration of the elastic torsion element, thus reducing the vibrational vehicle behavior.

In a preferred embodiment of the present invention, the clutch controller reduces the transmission torque of the clutch by operating the clutch in a disengaging direction. With this arrangement, the clutch is operated in the disengaging direction according to the torsion rate of the elastic torsion element, such that the transmission torque of the clutch is reduced. This reduces the torsional vibration of the elastic torsion element.

In a preferred embodiment of the present invention, the elastic torsion element includes a clutch damper. With this arrangement, the clutch damper is able to reduce a shock occurring in the engagement of the clutch. On the other hand, the clutch damper defines and functions as the elastic torsion element, and is liable to cause greater-amplitude torsional vibration. Therefore, the transmission torque of the clutch is controlled according to the torsion rate of the elastic torsion element including the clutch damper, thus making it possible to reduce the vibrational vehicle behavior attributable to the torsional vibration, while reducing the shock in the clutch engagement. This improves the ride feeling of the vehicle.

In a preferred embodiment of the present invention, the torque generator includes an electric motor. The vehicle controller is configured or programmed to include a motor controller that corrects the torque generated by the torque generator by controlling a torque generated by the electric motor according to the torsion rate of the elastic torsion element.

With this arrangement, the torque generated by the electric motor is corrected according to the torsion rate of the elastic torsion element. This reduces the torsional vibration of the elastic torsion element to significantly reduce or prevent the vibrational vehicle behavior of an electric vehicle.

In a preferred embodiment of the present invention, the vehicle controller is configured or programmed to include a torsion rate computation unit to compute the torsion rate by using an upstream rotation speed corresponding to the rotation speed of a rotation shaft of the torque transmission system upstream of the elastic torsion element.

With this arrangement, the torsion rate of the elastic torsion element is computed by using the rotation speed (upstream rotation speed) of the rotation shaft of the torque transmission system upstream of the elastic torsion element. Thus, the torsion rate is accurately computed. Accordingly, the torque generated by the torque generator is properly corrected. This makes it possible to efficiently reduce the torsional vibration of the elastic torsion element, thus providing an excellent vehicle behavior.

In a preferred embodiment of the present invention, the vehicle controller further includes an upstream rotation speed sensor to detect the upstream rotation speed. With this arrangement, the rotation speed (upstream rotation speed) of the rotation shaft of the torque transmission system upstream of the elastic torsion element is actually detected by the upstream rotation speed sensor, so that the torsion rate is more accurately computed. This makes it possible to properly correct the torque generated by the torque generator, thus providing a more excellent vehicle behavior.

The upstream rotation speed sensor may detect the rotation speed of the rotation shaft at any position of a portion of the torque transmission system extending from an output rotation shaft of the torque generator to an upstream end of the elastic torsion element.

In a preferred embodiment of the present invention, the torsion rate computation unit computes the torsion rate by further using a downstream rotation speed corresponding to the rotation speed of a rotation shaft of the torque transmission system downstream of the elastic torsion element.

With this arrangement, the torsion rate is accurately computed by using the upstream rotation speed and the downstream rotation speed. Accordingly, the torque generated by the torque generator is properly corrected, thus providing an excellent vehicle behavior.

In a preferred embodiment of the present invention, the vehicle controller is configured or programmed to further include a downstream rotation speed estimation unit to estimate the downstream rotation speed based on the upstream rotation speed. This arrangement allows for the estimation of the downstream rotation speed based on the upstream rotation speed, obviating the need for a sensor to detect the downstream rotation speed. This arrangement is simple and yet makes it possible to significantly reduce or prevent an uncomfortable vehicle behavior attributable to the vibration of the elastic torsion element.

In a preferred embodiment of the present invention, the vehicle controller is configured or programmed to further include a downstream rotation speed computation unit to compute the downstream rotation speed based on a detection result provided by at least one of a vehicle position sensor, a vehicle speed sensor, and a vehicle acceleration sensor.

Thus, the torsion rate of the elastic torsion element is accurately determined by computing the downstream rotation speed based on the output signal of any of the sensors. This makes it possible to efficiently converge the torsional vibration of the elastic torsion element, thus more efficiently reducing the vibrational vehicle behavior.

According to a preferred embodiment of the present invention, there is provided an irregular ground traveling vehicle, which includes the torque generator, the driving wheels, and the vehicle controller described above. With this arrangement, the vibrational vehicle behavior attributable to the elastic torsion element of the torque transmission system is reduced in the irregular ground traveling vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A to 4C are time charts for describing an exemplary operation to be performed during the starting of the vehicle according to the first preferred embodiment of the present invention.

DETAILED DESCRIPTION OF THE PREFERRED EMBODIMENTS

Preferred embodiments of the present invention are applicable to vehicles of any form and any utility without particular limitation. A vehicle category in which the preferred embodiments of the present invention are particularly useful is a utility vehicle. In particular, the preferred embodiments of the present invention are useful for an off-road four-wheel vehicle referred to as Recreational Off-Highway Vehicle. The utility vehicle is an exemplary irregular ground traveling vehicle which is used for traveling on irregular ground.

Figure 1:
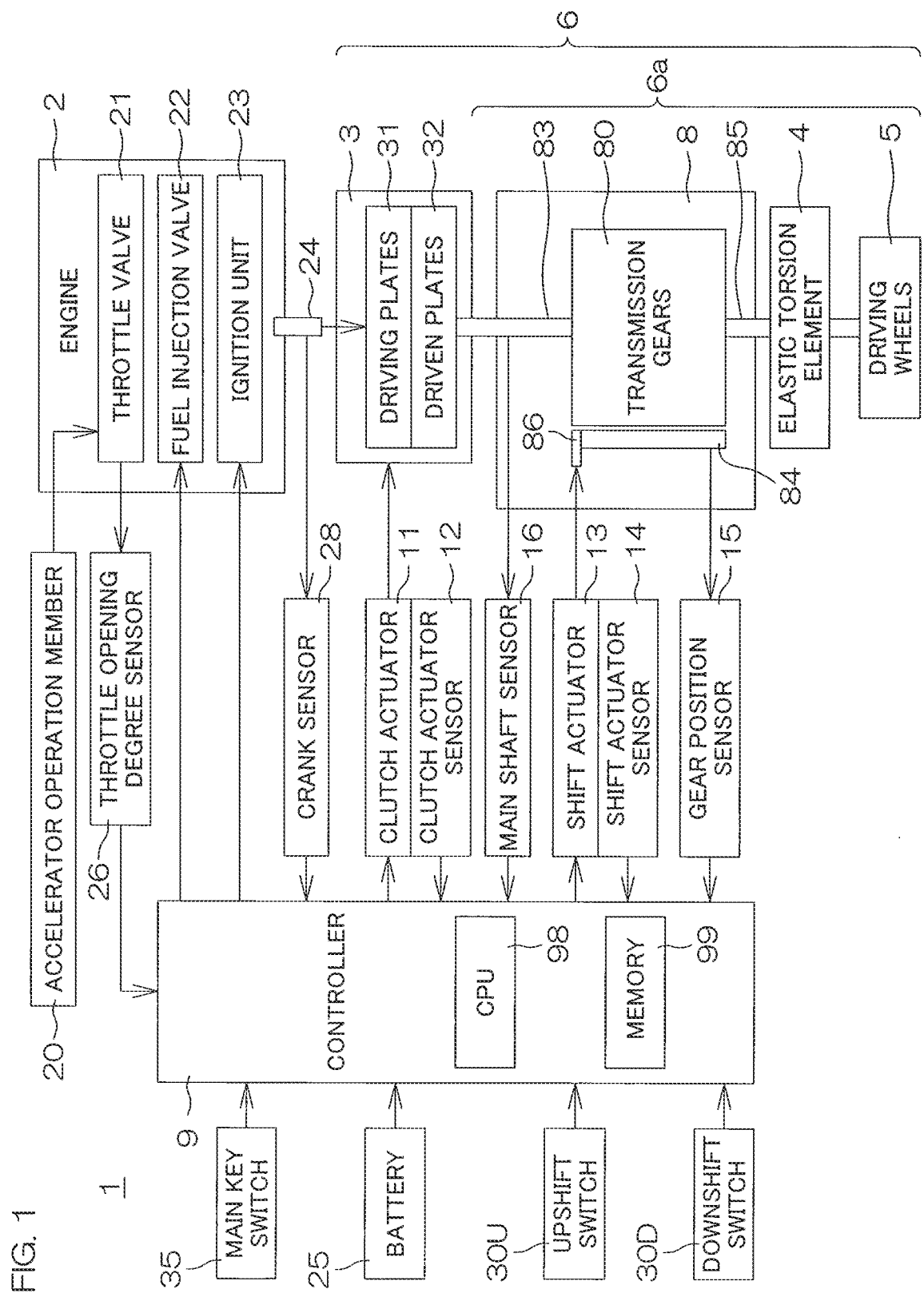
FIG. 1 is a block diagram showing the major construction of a vehicle including a vehicle controller according to a first preferred embodiment of the present invention.

FIG. 1 is a block diagram showing the major construction of a vehicle 1 including a vehicle control device according to a first preferred embodiment of the present invention. The vehicle 1 includes an engine (internal combustion engine) 2, a clutch 3, a transmission 8, and driving wheels 5. A driving force generated by the engine 2 is transmitted to the driving wheels 5 through a power transmission path 6. The clutch 3 and the transmission 8 are provided in the power transmission path 6. In the present preferred embodiment, the clutch 3 is located between the engine 2 and the transmission 8.

In the present preferred embodiment, the engine 2 and the clutch 3 define the torque generator, and the transmission torque of the clutch 3 is controlled such that a torque generated by the engine 2 is corrected by the clutch 3. The torque transmitted by the clutch 3 is transmitted to the driving wheels 5 via a torque transmission system 6a which defines a portion of the power transmission path 6. An elastic torsion element 4 is present in the torque transmission system 6a. In the present preferred embodiment, the elastic torsion element 4 includes elastic torsion components of all rigid bodies (elastic members) involved in the torque transmission in the torque transmission system 6a.

The engine 2 includes a throttle valve 21, a fuel injection valve 22, and an ignition unit 23. An accelerator operation member 20 to be operated by a driver is connected to the throttle valve 21. Therefore, the operation amount (accelerator opening degree) of the accelerator operation member 20 and the throttle opening degree have a certain correlation. The accelerator operation member 20 may be an acceleration pedal. The fuel injection valve 22 injects fuel into the engine 2, and the injection amount of the fuel is determined by the accelerator opening degree and the like. The ignition unit 23 causes spark discharge in the engine 2 at a predetermined ignition timing of an engine cycle, such that a fuel-air mixture is ignited.

The clutch 3 includes driving plates 31 and driven plates 32, and is arranged to move the driving plates 31 and the driven plates 32 toward and away from each other. The torque generated by the engine 2 (engine torque) is inputted to the driving plates 31. More specifically, the rotation of a crank shaft 24 of the engine 2 is transmitted to the driving plates 31. A reduction gear may be provided between the crank shaft 24 and the driving plates 31. The driven plates 32 are connected to a main shaft 83 of the transmission 8.

The transmission 8 includes the main shaft 83, a drive shaft 85, a plurality of transmission gears 80, a shift cam 84, and a shifter 86. The transmission gears 80 may be located at a plurality of gear positions. The plurality of gear positions include at least one forward drive gear position, and at least one reverse drive gear position. The rotation of the main shaft 83 is converted to rotation having a speed ratio and a direction corresponding to a gear position, and transmitted to the drive shaft 85. The drive shaft 85 is mechanically connected to the driving wheels 5. The shifter 86 is an operation member to operate the shift cam 84. The shift cam 84 is shifted (e.g., rotationally shifted), such that the transmission gears 80 are variably shifted. Thus, the gear position is selected.

The vehicle 1 further includes a clutch actuator 11, a shift actuator 13, and a controller 9. The controller 9 is an example of a main element of the vehicle control device. The controller 9 is configured or programmed to control the clutch actuator 11 and the shift actuator 13. The actuators 11, 13 may each be an electric actuator, or may each be a hydraulic actuator.

The clutch actuator 11 moves the driving plates 31 and the driven plates 32 of the clutch 3 toward and away from each other. Further, the clutch actuator 11 increases and reduces a pressing force applied between the driving plates 31 and the driven plates 32 with the driving plates 31 and the driven plates 32 in contact with each other. Thus, the driving plates 31 and the driven plates 32 are kept in frictional contact with each other, and the torque transmitted between the driving plates 31 and the driven plates 32 (transmission torque) is increased or reduced.

When the driving plates 31 and the driven plates 32 of the clutch 3 are moved toward each other or the pressing force applied between the driving plates 31 and the driven plates 32 is increased, this operation is meant by an expression that the clutch 3 is operated in an engaging direction. When the driving plates 31 and the driven plates 32 of the clutch 3 are moved away from each other or the pressing force applied between the driving plates 31 and the driven plates 32 is reduced, this operation is meant by an expression that the clutch 3 is operated in a disengaging direction.

The clutch 3 is able to assume a disengagement state, an engagement state, and a half-engagement state. In the disengagement state, the driving plates 31 and the driven plates 32 are spaced from each other, and the torque is not transmitted between the driving plates 31 and the driven plates 32. In the engagement state, the driving plates 31 and the driven plates 32 are connected to each other without sliding, and the torque is transmitted between the driving plates 31 and the driven plates 32. The half-engagement state is a state intermediate between the engagement state and the disengagement state. In the half-engagement state, the driving plates 31 and the driven plates 32 are kept in sliding contact with each other, and the torque is partly transmitted between the driving plates 31 and the driven plates 32. The clutch actuator 11 is controlled so that the state of the clutch 3 is changed among the disengagement state, the half-engagement state, and the engagement state, and the pressing force applied between the driving plates 31 and the driven plates 32 is changed in the half-engagement state.

A clutch actuator sensor 12 is provided so as to detect the position of an operation member of the clutch actuator 11. The position of the operation member of the clutch actuator 11 corresponds to distances between the driving plates 31 and the driven plates 32 of the clutch. With the driving plates 31 and the driven plates 32 in contact with each other, the distances correspond to the pressing force applied between the driving plates 31 and the driven plates 32.

In the following description, a parameter "clutch pressing amount" is introduced which collectively means the distances between the driving plates 31 and the driven plates 32 and the pressing force applied between the driving plates 31 and the driven plates 32. Where the distances between the driving plates 31 and the driven plates 32 are greater, the clutch pressing amount is smaller. Where the distances between the driving plates 31 and the driven plates 32 are smaller, the clutch pressing amount is greater. Where the pressing force applied between the driving plates 31 and the driven plates 32 is greater with the driving plates 31 and the driven plates 32 in contact with each other, the clutch pressing amount is greater. That is, the clutch pressing amount is increased by operating the clutch 3 in the engaging direction, and is reduced by operating the clutch 3 in the disengaging direction.

Specifically, the clutch pressing amount corresponds to the distances between the driving plates 31 and the driven plates 32 and, more specifically, corresponds to the displacement amount of the operation member of the clutch actuator 11. The controller 9 drives the clutch actuator 11 based on an output signal of the clutch actuator sensor 12 to control the clutch pressing amount.

The shift actuator 13 actuates the shifter 86 to operate the shift cam 84, such that a shift operation is performed to change the gear position. A shift actuator sensor 14 is provided to detect the position of an operation member of the shift actuator 13. The position of the operation member of the shift actuator 13 corresponds to the position of the shifter 86. The controller 9 controls the shift actuator 13 based on an output signal of the shift actuator sensor 14.

The transmission 8 is provided with a gear position sensor 15 to detect the gear position, and a main shaft sensor 16 to detect the rotation speed of the main shaft 83. Output signals of these sensors are inputted to the controller 9. The main shaft sensor 16 is an example of the upstream rotation speed sensor. The gear position sensor 15 detects the gear position of the transmission 8. Specifically, the gear position sensor 15 may be a sensor which detects the position (e.g., rotational position) of the shift cam 84.

A main key switch 35, a battery 25, a throttle opening degree sensor 26, a crank sensor 28, an upshift switch 30U, a downshift switch 30D, and the like are connected to the controller 9.

The main key switch 35 is a key switch which is operated for electrical connection and disconnection to turn on and off the vehicle 1 with the use of a main key. The battery 25 supplies electric power to the controller 9 and other electrical components. The controller 9 monitors the voltage of the battery 25.

The throttle opening degree sensor 26 detects the throttle opening degree of the engine 2. Since the accelerator operation member 20 is connected to the throttle valve 21 of the engine 2, there is a certain correlation between the operation amount (accelerator opening degree) of the accelerator operation member 20 and the throttle opening degree. Therefore, the throttle opening degree sensor 26 also functions as an accelerator opening degree sensor to detect the operation amount of the accelerator operation member 20.

The crank sensor 28 detects the rotation of the crank shaft 24 of the engine 2. The crank sensor 28 generates a rotation pulse, for example, according to a rotation amount during the rotation of the crank shaft 24. The controller 9 determines an engine rotation speed based on the rotation pulse generated by the crank sensor 28. The engine rotation speed has a value corresponding to the rotation speed of the driving plates 31 of the clutch 3.

The upshift switch 30U is a switch to be operated by the driver to change the gear position (shift stage) of the transmission 8 to a higher speed side by one stage. The downshift switch 30D is a switch to be operated by the driver to change the gear position (shift stage) of the transmission 8 to a lower speed side by one stage. Output signals of these shift switches 30U, 30D are inputted to the controller 9. The controller 9 drives the clutch actuator 11 and the shift actuator 13 according to the inputs of the shift switches 30U, 30D to perform a shift operation to change the gear position (shift stage) among the forward drive gear positions.

To start the vehicle 1, the driver operates the shift switches 30U, 30D to select any of the gear positions other than a neutral position. Thus, the controller 9 drives the shift actuator 13 to change the position of the transmission gear 80 of the transmission 8 to the selected gear position. The driver further operates the accelerator operation member 20 to increase the accelerator opening degree. As the throttle opening degree is increased, the engine rotation speed is correspondingly increased. According to the increase in the engine rotation speed, the controller 9 controls the clutch actuator 11 to increase the clutch pressing amount, such that the driving plates 31 and the driven plates 32 are moved toward each other.

The controller 9 sets a target engine rotation speed according to the throttle opening degree, and controls the clutch pressing amount so as to increase the engine rotation speed to the target engine rotation speed. Thus, the pressing force applied between the driving plates 31 and the driven plates 32 is gradually increased, such that the clutch 3 is brought into the engagement state from the disengagement state through the half-engagement state.

Thus, the torque generated by the engine 2 is transmitted to the transmission 8 via the clutch 3. Further, the rotation speed-changed by the transmission 8 is transmitted to the driving wheels 5, such that the vehicle 1 is moved. After the clutch 3 reaches the engagement state, the controller 9 controls the fuel injection valve 22 (for a fuel injection control operation) and controls the ignition unit 23 (for an ignition control operation) so as to provide an engine output according to the throttle opening degree.

When the driver operates the upshift switch 30U or the downshift switch 30D during traveling, a shift command is inputted to the controller 9. In response to the shift command, the controller 9 performs the shift operation. Specifically, the controller 9 controls the clutch actuator 11 to disengage the clutch 3. Further, the controller 9 controls the shift actuator 13 to change the position of the transmission gear 80 to the selected gear position corresponding to the shift command. Thereafter, the controller 9 controls the clutch actuator 11 to bring the clutch 3 into the engagement state through the half-engagement state. When the shift operation is completed with the clutch 3 brought into the engagement state, the controller 9 performs the fuel injection control operation and the ignition control operation so as to provide the engine output according to the throttle opening degree.

When the vehicle speed is reduced to below a downshift threshold predetermined for each of the gear positions with the clutch 3 assuming the engagement state, the controller 9 performs an automatic downshift control operation. More specifically, when the vehicle speed is reduced to below the clutch disengagement threshold predetermined for each of the shift stages, the controller 9 controls the clutch actuator 11 to bring the clutch 3 into the disengagement state. When the vehicle speed is reduced to below the downshift threshold, the controller 9 controls the shift actuator 13 to change the gear position so as to shift down the shift stage by one. If the vehicle speed is further reduced to below the downshift threshold for the shift stage after the downshift, the controller 9 changes the gear position so as to further shift down the shift stage by one. Thereafter, the controller 9 controls the clutch actuator 11 to bring the clutch 3 into the engagement state through the half-engagement state. When the shift operation is completed with the clutch 3 brought into the engagement state, the controller 9 performs the fuel injection control operation and the ignition control operation so as to provide the engine output corresponding to the throttle opening degree.

When the shift stage is the lowest shift stage and the vehicle speed is reduced to below the clutch disengagement threshold corresponding to the lowest shift stage, the controller 9 disengages the clutch 3. More specifically, when the lowest forward drive gear position is selected from the plurality of forward drive gear positions and the vehicle speed is reduced to below the clutch disengagement threshold, the clutch 3 is disengaged.

Figure 2:
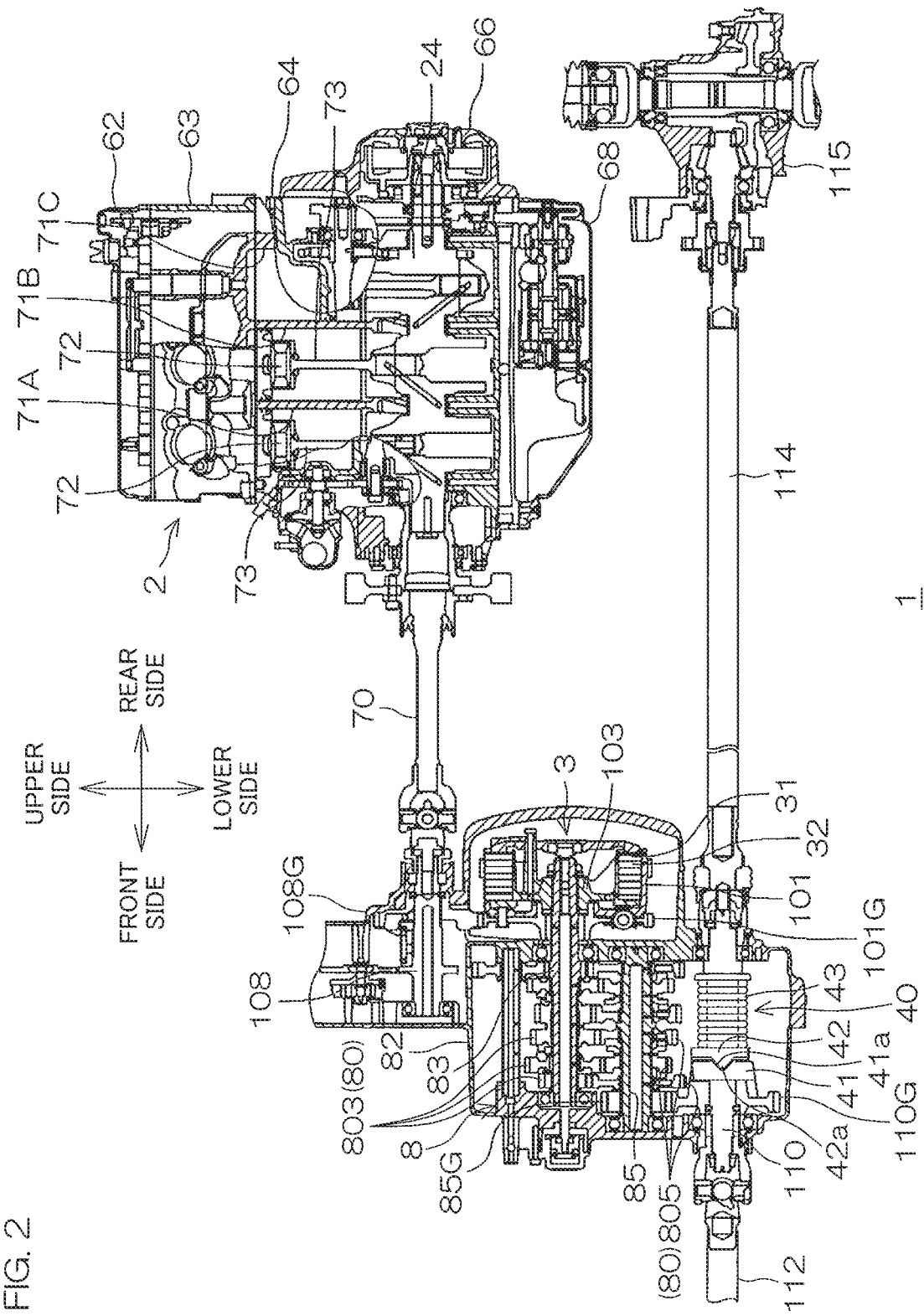
FIG. 2 is a sectional view showing the construction of an engine and a transmission provided in the vehicle by way of specific example.

FIG. 2 is a sectional view showing the construction of the engine 2 and the transmission 8 by way of specific example. The engine 2 includes a crank case 66, a cylinder body 64, a cylinder head 63, and a cylinder head cover 62. An oil pan 68 which recovers oil circulated within the engine 2 is located below the crank case 66.

The crank shaft 24 of the engine 2 extends anteroposteriorly of the vehicle. The crank shaft 24 is located in the crank case 66. A coupling shaft 70 is connected to a front end of the crank shaft 24.

Cylinders 71A, 71B, 71C are provided in the cylinder body 64. Pistons 72 are respectively accommodated in the cylinders 71A, 71B, 71C. The pistons 72 are connected to the crank shaft 24 via control rods 73. In this example, the engine 2 is a three-cylinder engine including the three cylinders 71A to 71C. Alternatively, the engine 2 may be a single-cylinder engine including a single cylinder, a two-cylinder engine including two cylinders, or a multi-cylinder engine including four or more cylinders.

The coupling shaft 70 is coupled to an input shaft 108. The input shaft 108 extends anteroposteriorly of the vehicle. The input shaft 108 receives the driving force of the crank shaft 24 via the coupling shaft 70 to thus be rotated. The input shaft 108 may be coupled directly to the crank shaft 24 without the provision of the coupling shaft 70. A gear 108G is provided around the input shaft 108. The rotation of the input shaft 108 is transmitted to the clutch 3 via the gear 108G.

In the present preferred embodiment, the clutch 3 is a wet multi-plate frictional clutch. A torque generated by the crank shaft 24 is transmitted to the clutch 3 via the input shaft 108. The clutch 3 is able to intermittently transmit the torque generated by the crank shaft 24. The clutch 3 is provided at one end (a rear end in the present preferred embodiment) of the main shaft 83 of the transmission 8. The clutch 3 includes a clutch housing 101, a clutch boss 103, the driving plates 31, and the driven plates 32. The driving plates 31 are provided inward of the clutch housing 101. The driving plates 31 are rotated together with the clutch housing 101. The torque of the crank shaft 24 is transmitted to the driving plates 31 via the input shaft 108. The driven plates 32 are provided outward of the clutch boss 103. The driven plates 32 are rotated together with the clutch boss 103. The driving plates 31 and the driven plates 32 are alternately disposed anteroposteriorly of the vehicle. A gear 101G is provided around the clutch housing 101. The gear 101G meshes with the gear 108G provided around the input shaft 108. Therefore, the clutch housing 101 is coupled to the input shaft 108. The clutch 3 may be a single-plate frictional clutch, or may be a dry frictional clutch.

The transmission 8 includes a transmission case 82, the main shaft 83, the drive shaft 85, and the plurality of transmission gears 80.

The main shaft 83 is accommodated in the transmission case 82. The main shaft 83 is parallel or substantially parallel to the input shaft 108. The main shaft 83 is fixed to the clutch boss 103. The main shaft 83 is rotated together with the clutch boss 103. Therefore, the main shaft 83 receives the driving force of the crank shaft 24 to be rotated. The transmission gears 80 include a plurality of main shaft gears 803 provided around the main shaft 83.

The drive shaft 85 is accommodated in the transmission case 82. The drive shaft 85 is parallel or substantially parallel to the main shaft 83. The transmission gears 80 include a plurality of drive shaft gears 805 provided around the drive shaft 85. A gear 85G is provided at one end (a front end in the present preferred embodiment) of the drive shaft 85.

An output shaft 110 extending anteroposteriorly of the vehicle is located below the transmission 8. A gear 110G is provided around the output shaft 110. The gear 110G meshes with the gear 85G provided around the drive shaft 85. Therefore, the output shaft 110 is coupled to the drive shaft 85. The output shaft 110 receives the driving force of the drive shaft 85 to be rotated. A front propeller shaft 112 is coupled to a front end of the output shaft 110. The front propeller shaft 112 extends anteroposteriorly of the vehicle. The front propeller shaft 112 receives the driving force of the output shaft 110 to be rotated. The front propeller shaft 112 is coupled to right and left front wheels (front driving wheels 5, see FIG. 1) via a front differential (not shown). A rear propeller shaft 114 is coupled to a rear end of the output shaft 110. The rear propeller shaft 114 extends anteroposteriorly of the vehicle. The rear propeller shaft 114 receives the driving force of the output shaft 110 to be rotated. The rear propeller shaft 114 is coupled to right and left rear wheels (rear driving wheels 5, see FIG. 1) via a final gear 115. In the present preferred embodiment, the vehicle 1 is a four-wheel drive vehicle, but is not limited thereto.

The output shaft 110 is provided with a clutch damper 40 to reduce a shock during the torque transmission. The clutch damper 40 is provided between the gear 110G and the output shaft 110 to transmit the torque between the gear 110G and the output shaft 110. Specifically, the clutch damper 40 includes a first member 41 to be rotated about the output shaft 110 together with the gear 110G, a second member 42 connected to the output shaft 110 through spline engagement to be rotated together with the output shaft 110, and a compression coil spring 43 wound around the output shaft 110. A projection 42a provided on the second member 42 is engaged with a recess 41a provided in the first member 41, and the coil spring 43 biases the second member 42 toward the first member 41 so as to maintain the engagement between the projection 42a and the recess 41a. When the torque is inputted to the gear 110G to rotate the first member 41, the projection 42a is moved up on a tilt surface of the recess 41a, and the rotation of the first member 41 is transmitted to the second member 42 by a frictional force occurring between the recess 41a and the projection 42a.

The clutch damper 40 is one element of the elastic torsion element 4 (see FIG. 1) provided in the torque transmission system 6a extending from the clutch 3 to the driving wheels 5. In the present preferred embodiment, however, the elastic torsion element 4 includes elastic torsion components of all the rigid bodies (elastic members) involved in the torque transmission in the torque transmission system 6a. More specifically, the elastic torsion element 4 includes not only the torsion component of the clutch damper 40, but also the torsion components of the drive shaft 85, the output shaft 110, the propeller shafts 112, 114, and the like, and includes the torsion components of elastic elements (including tires) of the driving wheels 5.

Figure 3:
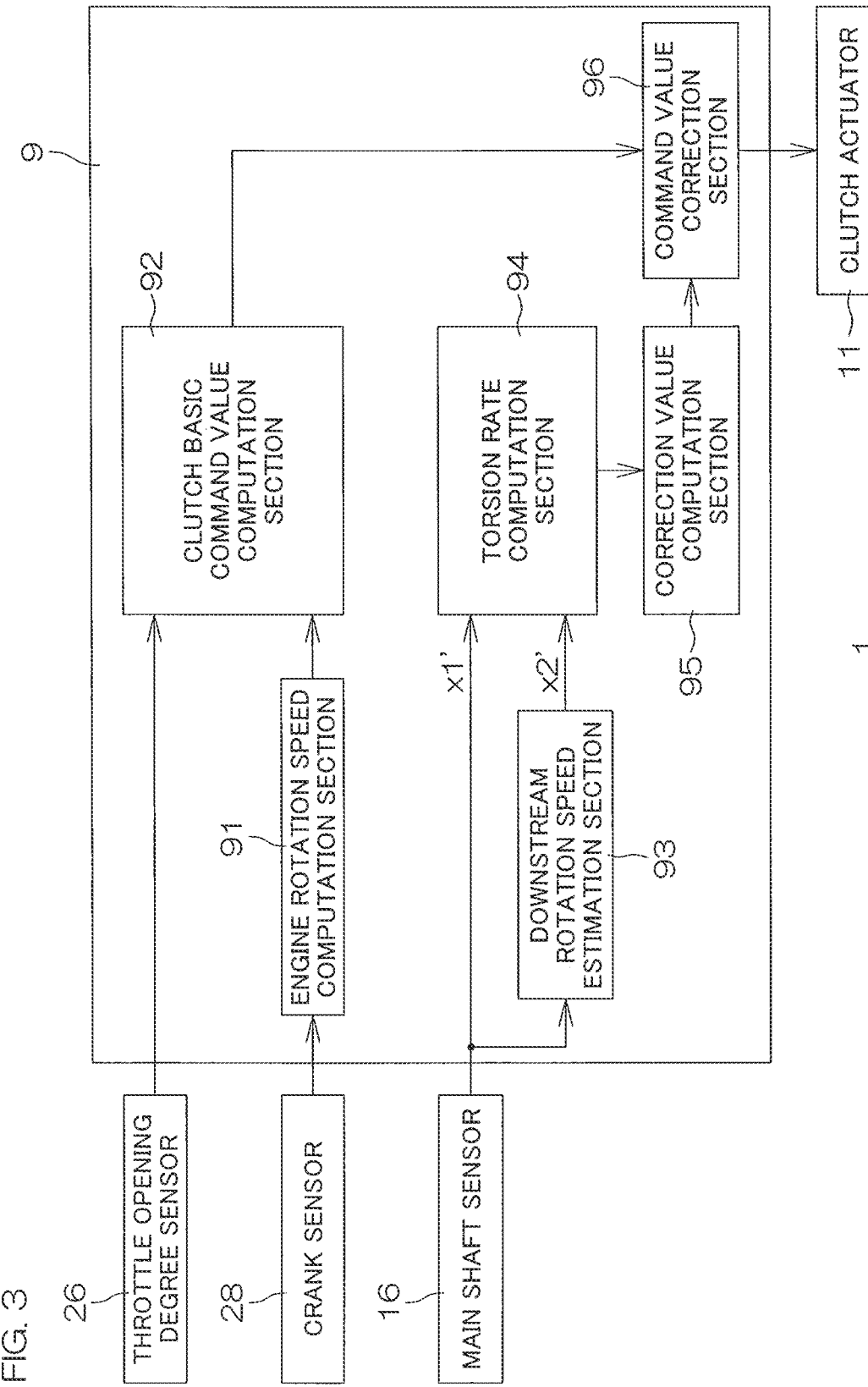
FIG. 3 is a control block diagram for describing the function of a controller of the vehicle that controls a clutch.

FIG. 3 is a control block diagram for describing the function of the controller 9 that controls the clutch 3. The controller 9 is configured or programmed to embody the functions of an engine rotation speed computation section 91, a clutch basic command value computation section 92, a downstream rotation speed estimation section 93, a torsion rate computation section 94, a correction value computation section 95, a command value correction section 96, and the like. Specifically, as shown in FIG. 1, the controller 9 includes a CPU 98 (processor) and a memory 99. The CPU 98 executes a program stored in the memory 99 to embody the functions of the above-described sections to function as the clutch controller. The downstream rotation speed estimation section 93 is an example of the downstream rotation speed estimation unit. The torsion rate computation section 94 is an example of the torsion rate computation unit.

The engine rotation speed computation section 91 computes the engine rotation speed with the use of the pulse signal inputted from the crank sensor 28. The clutch basic command value computation section 92 computes a clutch basic command value according to the throttle opening degree detected by the throttle opening degree sensor 26 and the engine rotation speed computed by the engine rotation speed computation section 91. The clutch basic command value may be a basic value of the pressing amount of the clutch 3, and corresponds to a basic value of the torque to be transmitted by the clutch 3.

The downstream rotation speed estimation section 93 performs computation on the main shaft rotation speed detected by the main shaft sensor 16 to estimate the downstream rotation speed. The main shaft rotation speed is a rotation speed (upstream rotation speed) upstream of the elastic torsion element 4. The downstream rotation speed is a rotation speed downstream of the elastic torsion element 4, and may be, for example, a rotation speed obtained by converting the speed of the vehicle 1 (vehicle speed) into the rotation of the main shaft 83. The downstream rotation speed estimation section 93 may estimate the downstream rotation speed by performing a smoothing computation (e.g., low pass filter computation) on the main shaft rotation speed (upstream rotation speed). Parameters for the smoothing computation may be set so as to be compatible with the design of the vehicle 1.

The torsion rate computation section 94 computes the torsion rate of the elastic torsion element 4 based on the main shaft rotation speed and the downstream rotation speed. The torsion rate of the elastic torsion element 4 is the change rate of the torsion amount of the elastic torsion element 4 with time. The torsion amount is a difference $(x1-x2)$ between the upstream rotation amount $x1$ of the elastic torsion element 4 (the rotation amount of the main shaft 83) and the downstream rotation amount $x2$. Herein, the downstream rotation amount $x2$ is an amount obtained by converting the movement amount of the vehicle 1 into the rotation of the main shaft 83.

The torsion rate $(x1-x2)'$ which is the change rate of the torsion amount with time is obtained by differentiating the difference between the upstream rotation amount $x1$ and the downstream rotation amount $x2$ by time, and equals to a difference $(x1'-x2')$ between the change rate $x1'$ of the upstream rotation amount with time and the change rate $x2'$ of the downstream rotation amount with time. The change rate $x1'$ of the upstream rotation amount with time is the upstream rotation speed, i.e., the main shaft rotation speed. The change rate $x2'$ of the downstream rotation amount with time is the downstream rotation speed estimated by the downstream rotation speed estimation section 93. Therefore, the torsion rate computation section 94 is able to compute the torsion rate $(x1-x2)'$ of the elastic torsion element 4 by determining the difference $(x1'-x2')$ between the upstream rotation speed and the downstream rotation speed.

The correction value computation section 95 computes a correction value based on the torsion rate computed by the torsion rate computation section 94. Specifically, a correction value $c1(x1-x2)'$ may be computed by multiplying the torsion rate $(x1-x2)'$ by a certain factor $c1$ ($c1 \neq 0$). The factor $c1$ may be set to a proper value so as to be compatible with the actual design of the vehicle 1. More specifically, the factor $c1$ is determined based on the spring modulus of the elastic torsion element 4 and inertial masses (inertial moments) upstream and downstream of the elastic torsion element 4.

The command value correction section 96 corrects the clutch basic command value with the use of the above-described correction value to determine a clutch command value for the control of the clutch 3. Specifically, the clutch command value is a command value of the pressing amount of the clutch 3, and corresponds to a command value of the transmission torque of the clutch 3. The clutch actuator 11 is controlled based on the clutch command value, such that the pressing amount of the clutch 3 is controlled as corresponding to the clutch command value.

The command value correction section 96 corrects the clutch basic command value so that the correction value to be subtracted is increased as the torsion rate $(x1-x2)'$ increases. The correction is achieved by determining the correction value $c1(x1-x2)'$ (wherein the factor $c1$ has a positive value) and subtracting the correction value from the clutch basic command value. Alternatively, the correction may be similarly achieved by determining the correction value $c1(x1-x2)'$ (wherein the factor $c1$ has a negative value) and adding the correction value to the clutch basic command value. This correction is performed so as to operate the clutch 3 in the disengaging direction according to the torsion rate of the elastic torsion element 4 to reduce the transmission torque of the clutch 3.

FIGS. 4A to 4C are time charts for describing an exemplary operation to be performed during the starting of the vehicle in the present preferred embodiment. In FIG. 4A, the throttle opening degree is shown by a line 401, and the clutch command value is shown by a line 402. In FIG. 4B, the acceleration of the vehicle 1 is shown by a line 403, and the jerk degree of the vehicle 1 is shown by a line 404. The jerk degree is a value obtained by differentiating the acceleration with time, and is also referred to as the change rate of the acceleration. In FIG. 4C, the engine rotation speed is shown by a line 405, and the main shaft rotation speed is shown by a line 406. Further, the downstream rotation speed (corresponding to the vehicle speed) is shown by a line 407.

The driver starts operating the accelerator operation member 20 at time t1 to start the vehicle 1, and performs an operation to increase the throttle opening degree (line 401). Before this operation, the clutch command value is 0% (line 402), and the clutch 3 is maintained in the disengagement state. The clutch command value herein corresponds to the clutch pressing amount, and is expressed in percentage with 0% in the disengagement state and with 100% in the full engagement state.

After the engine rotation speed (line 405) starts increasing with the increase in the throttle opening degree (line 401), the clutch command value (line 402) rises to a certain level from 0% at time t2, and then monotonically (e.g., linearly) increases at a certain rate. At time t3, the driving plates 31 and the driven plates 32 of the clutch 3 start contacting each other to be brought into the half-engagement state, such that the torque transmission between the driving plates 31 and the driven plates 32 is started. Thus, the main shaft rotation speed (line 406) rises. In the presence of the elastic torsion element 4, the rise of the downstream rotation speed (line 407) is delayed behind the rise of the main shaft rotation speed (line 406) and, therefore, a significant difference (x1'−x2'≠0) occurs between the main shaft rotation speed x1' and the downstream rotation speed x2'. The difference is the torsion rate (x1−x2)' of the elastic torsion element 4. Since the clutch basic command value is corrected according to the torsion rate, the clutch command value (line 402) is corrected in a reducing direction (disengaging direction) as indicated by a reference character 410 when the main shaft rotation speed (line 406) rises.

With the torque transmission of the clutch 3 started, the acceleration of the vehicle 1 (line 403) has a significant value, and is gradually increased. Then, the jerk degree (line 404) changes according to the increase in the acceleration. The jerk degree is typically a cause of the pitching of the vehicle 1. Therefore, it is preferred to minimize the jerk degree as much as possible. This improves the ride feeling of the vehicle 1.

Figure 5A:
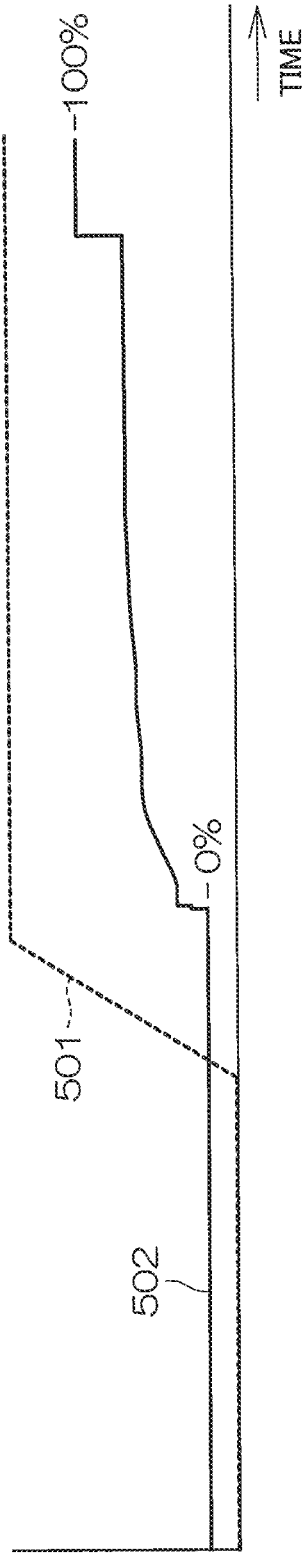
FIGS. 5A to 5C are time charts for describing an exemplary operation to be performed during the starting of the vehicle in a comparative example.
Figure 5B:
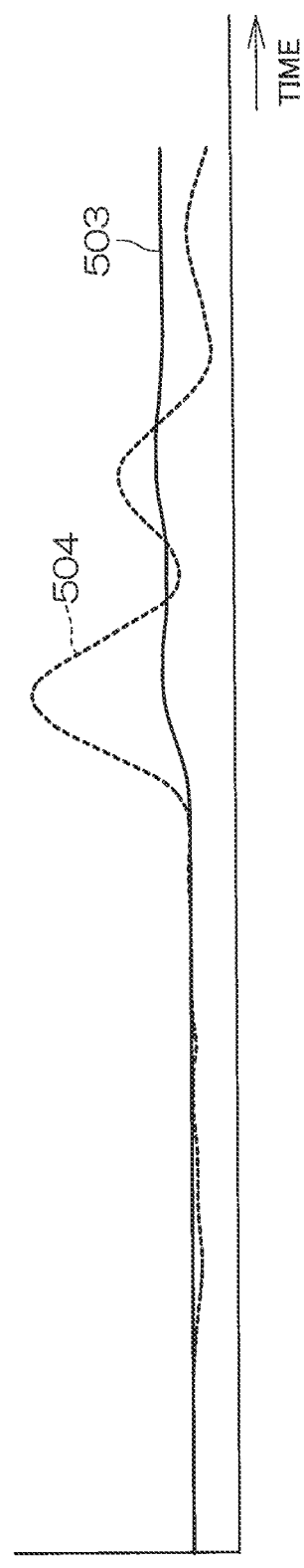
Figure 5C:
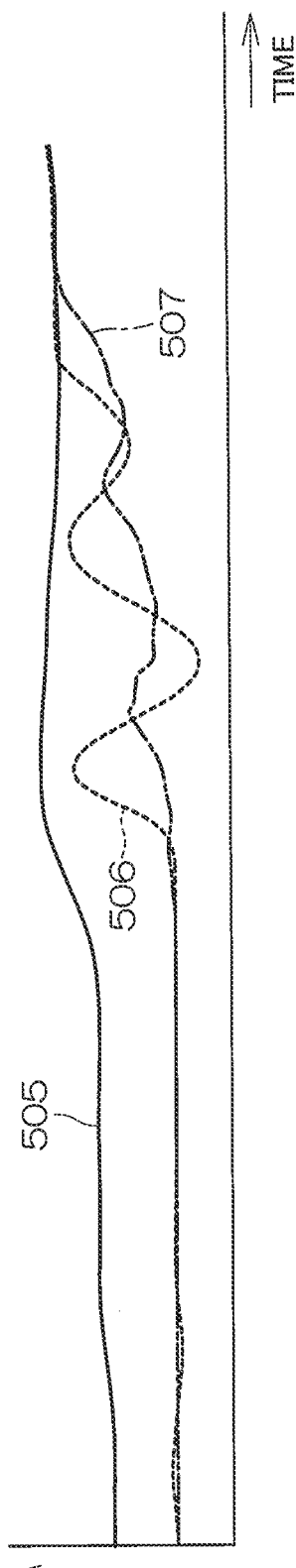

FIGS. 5A to 5C are time charts for describing an exemplary operation to be performed during the starting of the vehicle in a comparative example, and are similar to FIGS. 4A to 4C. In FIG. 5A, specifically, the throttle opening degree is shown by a line 501, and the clutch command value is shown by a line 502. In FIG. 5B, the acceleration of the vehicle 1 is shown by a line 503, and the jerk degree of the vehicle 1 is shown by a line 504. In FIG. 5C, the engine rotation speed is shown by a line 505, and the main shaft rotation speed is shown by a line 506. Further, the downstream rotation speed (corresponding to the vehicle speed) is shown by a line 507.

In the comparative example, the arrangement for the correction of the clutch basic command value is eliminated from the arrangement shown in FIG. 3, and the clutch basic command value is used as the clutch command value on an as-is basis.

After the torque transmission by the clutch 3 is started, the torsion amount of the elastic torsion element 4 is fluctuated with a greater amplitude, and it takes time to converge the fluctuation. Therefore, as indicated by the lines 506, 507, the fluctuations of the main shaft rotation speed and the downstream rotation speed are vibrational, and require time for convergence thereof. Accordingly, the acceleration of the vehicle 1 (line 503) is also vibrationally changed, so that a greater jerk degree (line 504) repeatedly appears. Therefore, the vehicle 1 suffers from a greater pitching phenomenon for a relatively long period of time, exhibiting an uncomfortable behavior. The uncomfortable vehicle behavior is reduced by employing the arrangement according to the preferred embodiments described above.

According to the present preferred embodiment, the transmission torque of the clutch 3 is thus controlled according to the torsion rate of the elastic torsion element 4, such that the torque generated by the engine 2 is corrected by the control of the clutch 3 and then transmitted to the driving wheels 5 through the power transmission path 6. Thus, the torsional vibration of the elastic torsion element 4 is reduced, thus reducing the vibrational vehicle behavior. Particularly, the vibrational vehicle behavior is reduced in the initial stage of the torque transmission.

Specifically, the controller 9 corrects the clutch command value so as to reduce the transmission torque by operating the clutch 3 in the disengaging direction according to the torsion rate of the elastic torsion element 4 during the engagement of the clutch 3. Thus, the torsional vibration of the elastic torsion element 4 is reduced in the initial stage of the torque transmission.

In the vehicle 1 of the present preferred embodiment, the elastic torsion element 4 of the torque transmission system 6a includes the clutch damper 40. Thus, the shock occurring in the clutch engagement is reduced. On the other hand, the clutch damper 40 is liable to cause a greater-amplitude torsional vibration. In the present preferred embodiment, therefore, the controller 9 controls the transmission torque of the clutch 3 according to the torsion rate of the elastic torsion element 4 including the clutch damper 40. This makes it possible to reduce the vibrational vehicle behavior attributable to the torsional vibration, while reducing the shock occurring in the clutch engagement. Thus, the ride feeling of the vehicle 1 is further improved.

As described above, the vehicle 1 is an example of the irregular ground traveling vehicle such as the recreational off-highway vehicle. The vehicle 1 of this type is required to be light-weight and to generate a higher torque. Therefore, the engine 2 is required to generate a higher torque, while the torque transmission system 6a which transmits the higher torque is required to be light-weight. To meet the requirement for the light weight, the increase of the rigidity of the torque transmission system 6a is limited, making it impossible to eliminate the elastic torsion element 4. In addition, the elastic torsion element 4 influences the motion characteristics of the vehicle 1 due to the shock reducing element such as the clutch damper 40, so that the uncomfortable pitching phenomenon attributable to the vibrational torsion of the elastic torsion element 4 is liable to occur. In the present preferred embodiment, which provides a solution to this problem, the vehicle 1 is light-weight and able to generate a higher torque, and yet ensures a comfortable ride feeling.

In the present preferred embodiment, the rotation speed of the main shaft 83, which corresponds to the rotation shaft of the torque transmission system 6a upstream of the elastic torsion element 4, is detected by the main shaft sensor 16. Therefore, the torsion rate of the elastic torsion element 4 is computed by using the actual rotation speed (upstream rotation speed) of the main shaft 83. Therefore, the torsion rate is accurately computed, such that the clutch command value is properly corrected. This makes it possible to efficiently reduce the torsional vibration of the elastic torsion element 4, thus providing an excellent vehicle behavior.

In the present preferred embodiment, the rotation speed of the rotation shaft of the torque transmission system 6a downstream of the elastic torsion element 4 is also used and, therefore, the torsion rate is more accurately computed. Accordingly, the clutch command value is properly corrected, thus providing an excellent vehicle behavior.

The present preferred embodiment estimates the downstream rotation speed based on the upstream rotation speed and, therefore, does not require a sensor to detect the downstream rotation speed. This makes it possible to reduce the uncomfortable vehicle behavior attributable to the vibration of the elastic torsion element 4 even with a simple construction.

Figure 6:
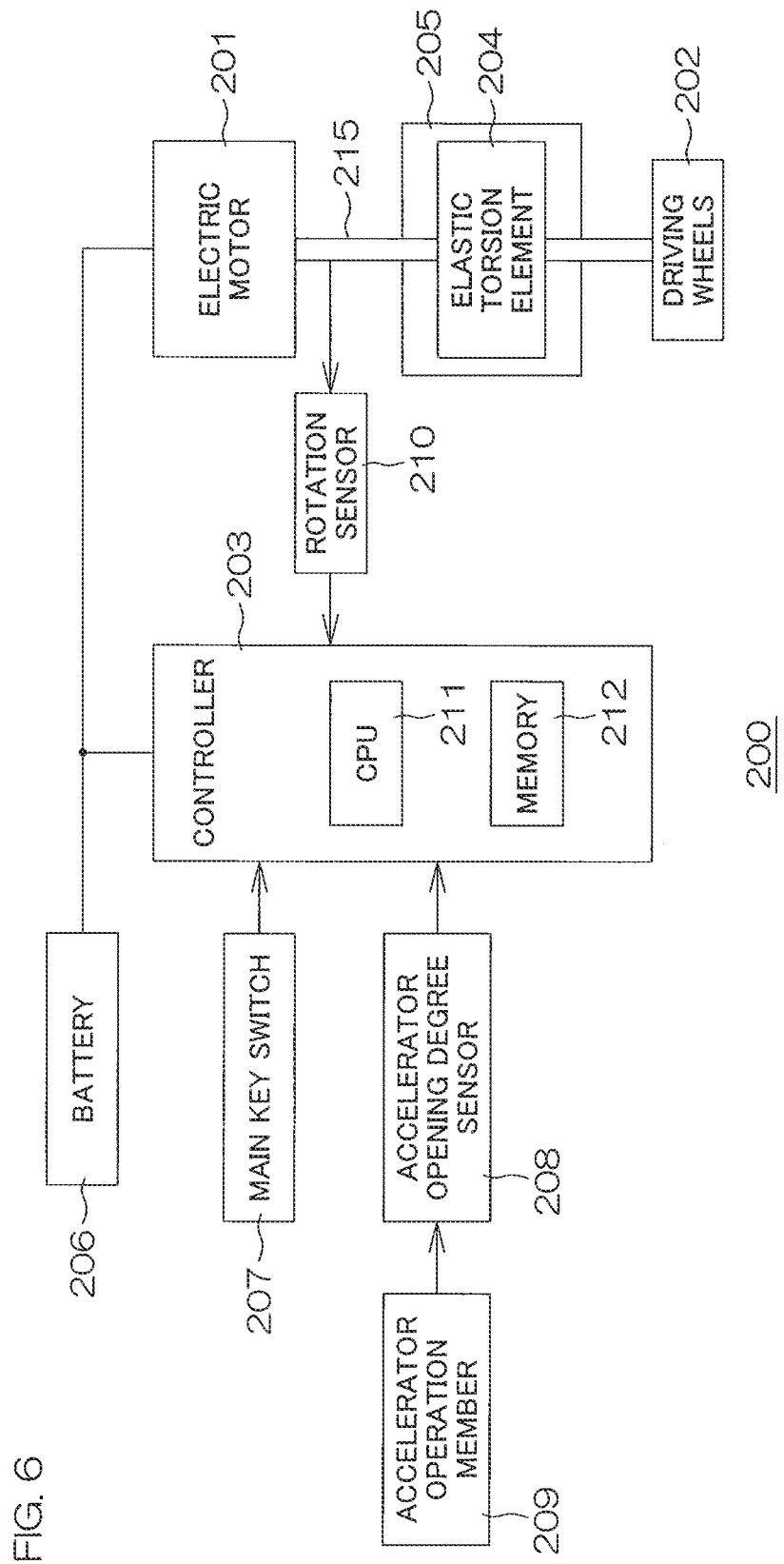
FIG. 6 is a block diagram for describing the construction of a vehicle according to a second preferred embodiment of the present invention.

FIG. 6 is a block diagram for describing the construction of a vehicle 200 according to a second preferred embodiment of the present invention. In the present preferred embodiment, the vehicle 200 has substantially the same construction as in the first preferred embodiment, and is an off-road four-wheeled vehicle typified by a recreational off-highway vehicle. In the present preferred embodiment, an electric motor 201 is the torque generator, while the engine (internal combustion engine) is the drive source (torque generation source) in the previous preferred embodiment. That is, the vehicle 200 according to the present preferred embodiment is an electric vehicle.

The vehicle 200 includes the electric motor 201, driving wheels 202, and a controller 203. A driving force generated by the electric motor 201 is transmitted to the driving wheels 202 through a torque transmission system 205. The controller 203 is an example of a main element of the vehicle control device, and includes a CPU 211 (processor) and a memory 212. The CPU 211 executes a program stored in the memory 212, such that the controller 203 functions as the motor controller to control the electric motor 201.

A battery 206, a main key switch 207, an accelerator opening degree sensor 208, and the like are connected to the controller 203.

The main key switch 207 is a key switch which is operated to turn on the vehicle 200 with the use of a main key for electrical connection and disconnection. The battery 206 supplies electric power to the electric motor 201, the controller 203, and other electrical components. The controller 203 monitors the voltage of the battery 206. The accelerator opening degree sensor 208 detects the operation amount (accelerator opening degree) of an accelerator operation member 209.

To start the vehicle 200, the driver operates the accelerator operation member 209 to increase the accelerator opening degree. According to the operation, the controller 203 causes the electric motor 201 to generate a torque and increase the torque. That is, the controller 203 generates a torque command value according to the accelerator opening degree, and controls the power supply to the electric motor 201 so that the torque generated by the electric motor 201 is increased to the torque command value. Thus, the torque generated by the electric motor 201 is transmitted to the driving wheels 202 through the torque transmission system 205, such that the vehicle 200 is started.

As shown in FIG. 6, an elastic torsion element 204 is provided in the torque transmission system 205 extending from the electric motor 201 to the driving wheels 202. The elastic torsion element 204 is an elastic torsion component present in the torque transmission system 205 which transmits the rotation of the electric motor 201 to the driving wheels 202. Torsion elements such as elastic elements (including tires) of the driving wheels 202 are also included in the elastic torsion element 204.

A rotation sensor 210 to detect the rotation of the electric motor 201 is incorporated in the electric motor 201 or provided outside the electric motor 201. In the present preferred embodiment, the rotation sensor 210 detects the rotation of an output rotation shaft 215 of the electric motor 201. The output rotation shaft 215 is an example of the rotation shaft located upstream of the elastic torsion element 204 in the torque transmission system 205. An output signal of the rotation sensor 210 is inputted to the controller 203.

Figure 7:
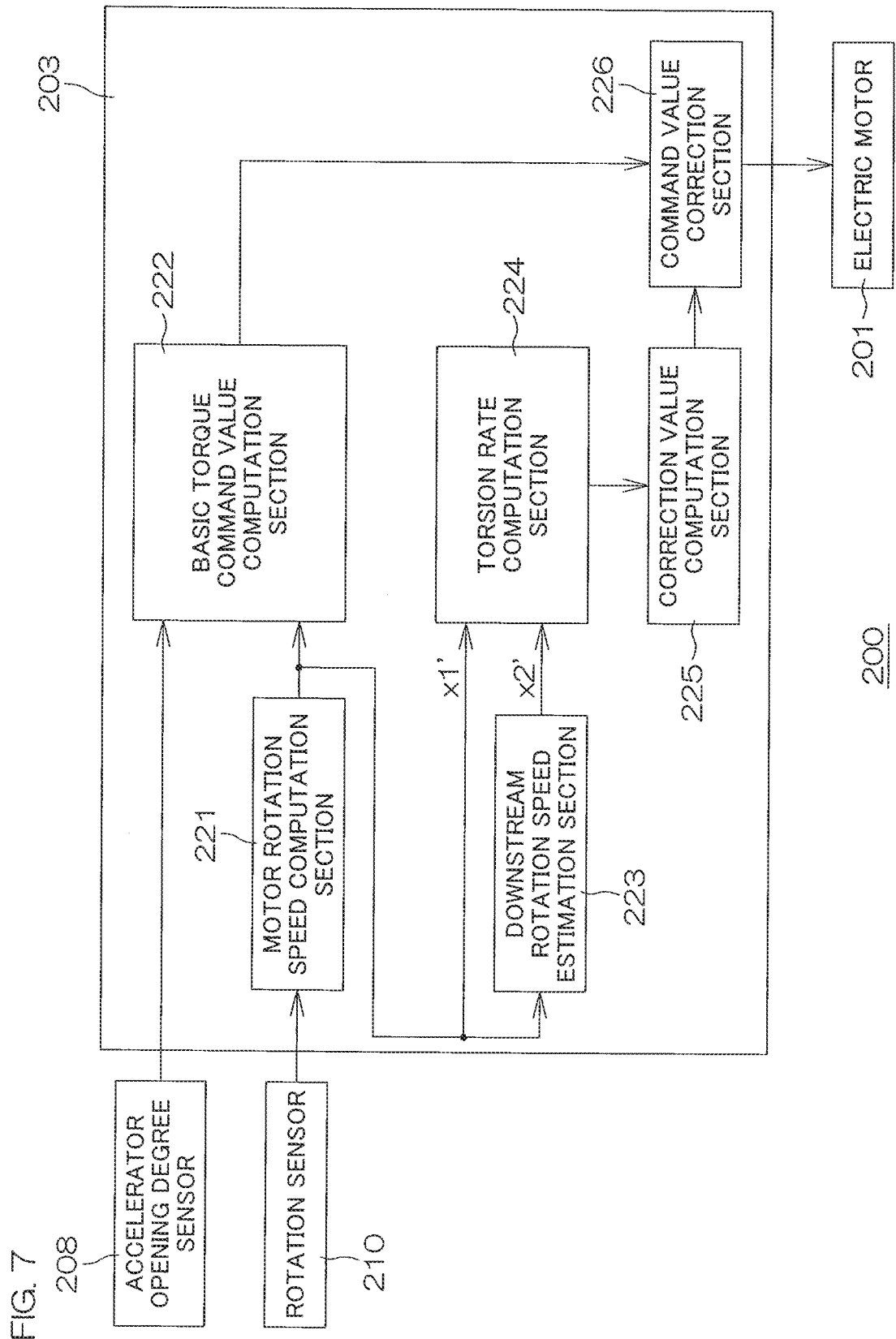
FIG. 7 is a control block diagram for describing the function of a controller that controls an electric motor in the second preferred embodiment of the present invention.

FIG. 7 is a control block diagram for describing the function of the controller 203 that controls the electric motor 201. The controller 203 is configured or programmed to embody the functions of a motor rotation speed computation section 221, a basic torque command value computation section 222, a downstream rotation speed estimation section 223, a torsion rate computation section 224, a correction value computation section 225, a command value correction section 226, and the like. Specifically, the controller 203 includes the CPU 211 and the memory 212 (see FIG. 6), and the CPU 211 executes a program stored in the memory 212 to embody the functions of the above-described sections.

The motor rotation speed computation section 221 computes the rotation speed of the output rotation shaft 215 of the electric motor 201 based on the output signal of the rotation sensor 210. The rotation speed is an example of the rotation speed (upstream rotation speed) of the rotation shaft upstream of the elastic torsion element 204. The basic torque command value computation section 222 computes a basic torque command value according to the accelerator opening degree detected by the accelerator opening degree sensor 208, and a motor rotation speed computed by the motor rotation speed computation section 221. The basic torque command value is a basic target value of the torque to be generated by the electric motor 201.

The downstream rotation speed estimation section 223 performs a computation on the rotation speed (upstream rotation speed) computed by the motor rotation speed computation section 221 to estimate a downstream rotation speed. The downstream rotation speed may be a rotation speed obtained, for example, by converting the speed (vehicle speed) of the vehicle 200 into the rotation of the output rotation shaft 215 of the electric motor 201.

The torsion rate computation section 224 computes the torsion rate of the elastic torsion element 204 based on the rotation speed (upstream rotation speed) of the output rotation shaft 215 and the downstream rotation speed. As in the above-described preferred embodiment, the torsion rate computation section 224 computes the torsion rate $(x1-x2)'$ of the elastic torsion element 204 by calculating a difference $(x1'-x2')$ between the upstream rotation speed $x1'$ and the downstream rotation speed $x2'$.

The correction value computation section 225 computes a correction value based on the torsion rate computed by the torsion rate computation section 224. As in the above-described preferred embodiment, specifically, a correction value $c2(x1-x2)'$ may be computed by multiplying the torsion rate $(x1-x2)'$ by a certain factor $c2$ ($c2 \neq 0$). The factor $c2$ may be set to a proper value so as to be compatible with the actual design of the vehicle 200. More specifically, the factor $c2$ is determined based on the spring modulus of the elastic torsion element 204 and the inertial masses (inertial moments) upstream and downstream of the elastic torsion element 204.

The command value correction section 226 determines the torque command value for the control of the electric motor 201 by correcting the basic torque command value with the use of the above-described correction value. The electric motor 201 is controlled based on the torque command value. Thus, the electric motor 201 is controlled so as to generate the torque according to the torque command value.

The command value correction section 226 corrects the basic torque command value so that the correction value to be subtracted is increased as the torsion rate $(x1-x2)'$ increases. The correction is achieved by determining the correction value $c2(x1-x2)'$ (wherein the factor $c2$ has a positive value) and subtracting the correction value $c2(x1-x2)'$ from the basic torque command value. Alternatively, the correction may be similarly achieved by determining the correction value $c2(x1-x2)'$ (wherein the factor $c2$ has a negative value) and adding the correction value $c2(x1-x2)'$ to the basic torque command value. This correction is performed so as to reduce the torque generated by the electric motor 201 according to the torsion rate of the elastic torsion element 204.

With the present preferred embodiment in which the vehicle 200 is an electric vehicle, the jerk degree attributable to the elastic torsion element 204 is quickly converged as in the above-described embodiment. This makes it possible to reduce the pitching of the vehicle 200 during the starting of the vehicle. Thus, the vehicle 200 provides a comfortable ride feeling by reducing the vibrational vehicle behavior.

With this arrangement, the torque generated by the electric motor 201 is corrected according to the torsion rate of the elastic torsion element 204. This makes it possible to significantly reduce or prevent the torsional vibration of the elastic torsion element 204, thus reducing the vibrational vehicle behavior in the vehicle 200.

Figure 8A:
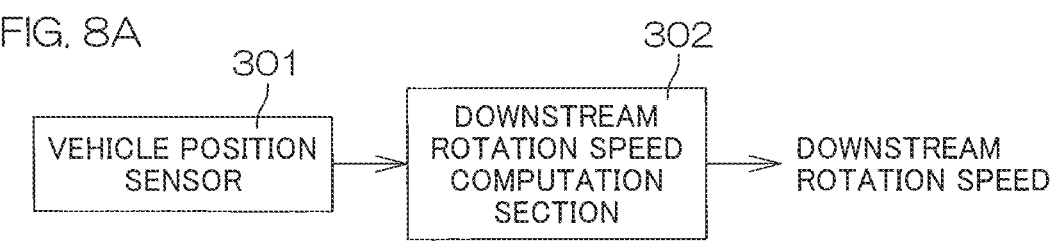
FIGS. 8A to 8C are block diagrams showing exemplary arrangements that determine a downstream rotation speed.
Figure 8B:
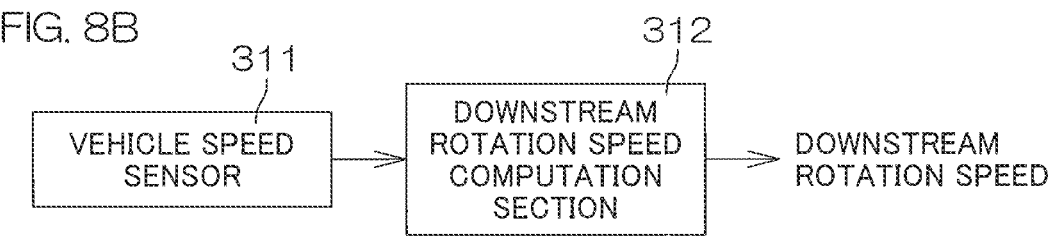
Figure 8C:
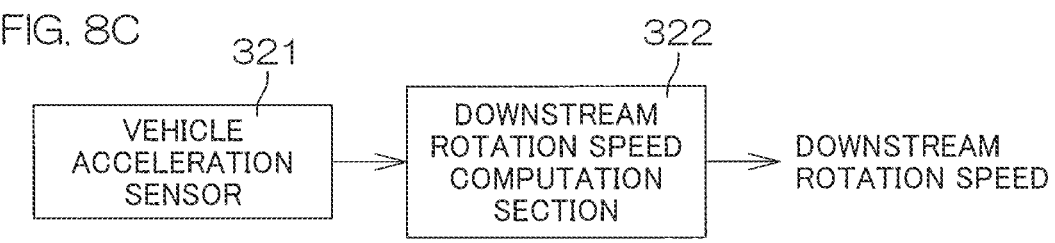

FIGS. 8A to 8C illustrate other exemplary arrangements to determine the downstream rotation speed. These arrangements are applicable to the first and second preferred embodiments described above. In the first and second preferred embodiments, the downstream rotation speed is determined by the estimation computation based on the upstream rotation speed (main shaft rotation speed or motor rotation speed). Alternatively, the downstream rotation speed may be computed by using a sensor output as will be described below.

In the exemplary arrangement of FIG. 8A, the downstream rotation speed is computed by a downstream rotation speed computation section 302 based on an output signal of a vehicle position sensor 301 which detects the position of the vehicle. Specifically, the vehicle speed is calculated by differentiating the output of the vehicle position sensor 301 with time. Therefore, the downstream rotation speed is calculated by converting the vehicle speed into the rotation speed of the main shaft 83 (see FIG. 1) or the rotation speed of the output rotation shaft 215 of the electric motor 201 (see FIG. 6). The vehicle position sensor 301 may be a GNSS (Global Navigation Satellite System) sensor. The downstream rotation speed computation section 302 is an example of the downstream rotation speed computation unit.

In the exemplary arrangement of FIG. 8B, the downstream rotation speed is computed based on an output signal of a vehicle speed sensor 311 by a downstream rotation speed computation section 312. The vehicle speed sensor 311 detects the movement speed of the vehicle. The downstream rotation speed is calculated by converting the vehicle speed detected by the vehicle speed sensor 311 into the rotation speed of the main shaft 83 (see FIG. 1) or the rotation speed of the output rotation shaft 215 of the electric motor 201 (see FIG. 6). The downstream rotation speed computation section 312 is an example of the downstream rotation speed computation unit. It is not appropriate to detect the vehicle speed based on the wheel speeds of the driving wheels 5, 202, because the driving wheels 5, 202 are elements of the elastic torsion element 4, 204.

In the exemplary arrangement of FIG. 8C, the downstream rotation speed is computed by a downstream rotation speed computation section 322 based on an output signal of a vehicle acceleration sensor 321 which detects the acceleration of the vehicle. The vehicle speed is calculated by integrating the output of the vehicle acceleration sensor 321 with time. The downstream rotation speed is calculated by converting the vehicle speed into the rotation speed of the main shaft 83 (see FIG. 1) or the rotation speed of the output rotation shaft 215 of the electric motor 201 (see FIG. 6). The downstream rotation speed computation section 322 is an example of the downstream rotation speed computation unit.

The torsion rate of the elastic torsion element 4, 204 is thus accurately determined by the arrangements in which the downstream rotation speed is computed based on the output signal of the sensor 301, 311, 321. This makes it possible to efficiently converge the torsional vibration of the elastic torsion element 4, 204 to more efficiently reduce the vibrational vehicle behavior. Two or all of the arrangements shown in FIGS. 8A, 8B and 8C may be used in combination to compute the downstream rotation speed with higher accuracy.

While preferred embodiments of the present invention have thus been described specifically, the invention can be embodied in some other ways.

In the first preferred embodiment described above, the transmission torque of the clutch 3 is controlled by the control of the clutch pressing amount, i.e., by the control of the shift position of the clutch 3. Alternatively, the pressing force applied between the driving plates 31 and the driven plates 32 of the clutch 3 may be controlled. Further, the transmission torque of the clutch 3 may be determined to be controlled.

In the first preferred embodiment described above, the torsion rate of the elastic torsion element 4 with respect to the main shaft 83 is determined by converting the downstream rotation speed into the rotation speed of the main shaft 83. Some other rotation shaft present in the power transmission path 6 may be used as the basis for the determination of the torsion rate. For example, the crank shaft 24 may be used as the basis, and the torsion rate of the elastic torsion element 4 may be determined by converting the main shaft rotation speed and the downstream rotation speed into the rotation speed of the crank shaft 24. In the second preferred embodiment, similarly, any of the rotation shafts through which the rotation of the electric motor 201 is transmitted may be used as the basis for the determination of the torsion rate.

The rotation speed of the main shaft 83 is detected as the upstream rotation speed in the first preferred embodiment described above, and the rotation speed of the output rotation shaft 215 of the electric motor 201 is detected as the upstream rotation speed in the second preferred embodiment. However, the upstream rotation speed sensor to detect the upstream rotation speed may detect the rotation speed of the rotation shaft at any position of a torque transmission system extending from the output rotation shaft of the torque generator to the upstream end of the elastic torsion element. In the first preferred embodiment, for example, the rotation speed of the rotation shaft may be detected at any position of a torque transmission system extending from the driven plates 32 of the clutch 3 to the upstream end of the elastic torsion element 4.

In the preferred embodiments described above, the control operations to be performed during the starting of the vehicle have been described in detail. In the first preferred embodiment, for example, the same control operation may be performed for the shift operation. That is, after the clutch 3 is disengaged for the shift operation, the shift actuator 13 is actuated to change the shift stage, and then the clutch 3 is engaged. In the control operation for the engagement of the clutch 3, the basic clutch command value may be corrected according to the torsion rate of the elastic torsion element 4. Thus, the vibrational vehicle behavior attributable to the torsional vibration of the elastic torsion element 4 is also prevented or reduced in the shift operation.

Further, the control operation to correct the torque generated by the torque generator according to the torsion rate of the elastic torsion element is performed during the starting of the vehicle and in the shift operation is not by way of limitation. In the first preferred embodiment, for example, the elastic torsion element 4 is liable to suffer from the torsional vibration when a speed reducing operation is performed on the accelerator operation member 20 (see FIG. 1) to suddenly close the throttle. In this case, the torsional vibration of the elastic torsion element 4 is able to be quickly converged by bringing the clutch 3 into the half-engagement state and controlling the transmission torque according to the torsion rate of the elastic torsion element 4. In the second preferred embodiment, similarly, the elastic torsion element 204 is liable to suffer from the torsional vibration due to sudden reduction in the torque generated by the electric motor 201 when the speed reducing operation is suddenly performed on the accelerator operation member 209 (see FIG. 6). In this case, the torsional vibration of the elastic torsion element 204 is able to be quickly converged by controlling the torque command value of the electric motor 201 according to the torsion rate of the elastic torsion element 204.

The control operation to correct the torque generated by the torque generator according to the torsion rate of the elastic torsion element may be constantly performed, or may be performed only in a traveling state assumed in at least one of the vehicle starting operation, the shift operation, and the speed reducing operation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control device for a vehicle driven by transmitting a torque generated by a torque generator to driving wheels, the control device comprising:
    a controller configured or programmed to correct the torque generated by the torque generator according to a torsion rate of an elastic torsion element present in a torque transmission system extending from the torque generator to the driving wheels; wherein
    the torque generator includes an engine and a clutch to transmit rotation of the engine to the torque transmission system; and
    the controller is configured or programmed to include a clutch controller to correct the torque generated by the torque generator by controlling a transmission torque of the clutch according to the torsion rate of the elastic torsion element.

2. The vehicle control device according to claim 1, wherein the clutch controller reduces the transmission torque of the clutch according to the torsion rate of the elastic torsion element.

3. The vehicle control device according to claim 2, wherein the clutch controller reduces the transmission torque of the clutch by operating the clutch in a disengaging direction.

4. The vehicle control device according to claim 1, wherein the elastic torsion element includes a clutch damper.

5. The vehicle control device according to claim 1, wherein the controller is configured or programmed to include a torsion rate computation unit to compute the torsion rate by using an upstream rotation speed corresponding to a rotation speed of a rotation shaft of the torque transmission system upstream of the elastic torsion element.

6. The vehicle control device according to claim 5, further comprising an upstream rotation speed sensor to detect the upstream rotation speed.

7. The vehicle control device according to claim 5, wherein the torsion rate computation unit computes the torsion rate by further using a downstream rotation speed corresponding to a rotation speed of a rotation shaft of the torque transmission system downstream of the elastic torsion element.

8. The vehicle control device according to claim 7, wherein the controller is configured or programmed to further include a downstream rotation speed estimation unit to estimate the downstream rotation speed based on the upstream rotation speed.

9. The vehicle control device according to claim 7, wherein the controller is configured or programmed to further include a downstream rotation speed computation unit to compute the downstream rotation speed based on a detection result provided by at least one of a vehicle position sensor, a vehicle speed sensor, and a vehicle acceleration sensor.

10. An irregular ground traveling vehicle comprising:
    the vehicle control device according to claim 1;
    the torque generator; and
    the driving wheels.

* * * * *